United States Patent [19]

Kurokawa

[11] Patent Number: 5,644,219

[45] Date of Patent: Jul. 1, 1997

[54] SOLAR ENERGY SYSTEM

[75] Inventor: Hiroyuki Kurokawa, Sakura, Japan

[73] Assignee: Kyocera Corporation, Kyoto, Japan

[21] Appl. No.: 431,229

[22] Filed: Apr. 28, 1995

[30] Foreign Application Priority Data

Apr. 28, 1994 [JP] Japan .................................. 6-092397

[51] Int. Cl.$^6$ .................................................. G05F 5/00
[52] U.S. Cl. .......................... 323/303; 136/293; 323/906
[58] Field of Search ................................. 323/299, 303, 323/906; 136/293

[56] References Cited

U.S. PATENT DOCUMENTS

| 4,449,057 | 5/1984 | Ishiwata | 323/906 X |
| 5,327,071 | 7/1994 | Frederick et al. | 323/299 |

FOREIGN PATENT DOCUMENTS

| 56-91630 | 7/1981 | Japan . |
| 62-126419 | 6/1987 | Japan . |
| 63-36318 | 2/1988 | Japan . |

OTHER PUBLICATIONS

Elektrische Energie-Technik, Jan. 1984, No. 1, pp. 59-60 (w/summary).

Primary Examiner—Peter S. Wong
Assistant Examiner—Y. J. Han
Attorney, Agent, or Firm—Loeb & Loeb LLP

[57] ABSTRACT

The object of the prevent invention is to provide a solar energy system of simple construction capable of utilizing the photovoltaic source always at a high efficiency without being affected by environmental changes or yearly declination of photovoltaic cell, etc.

A solar energy system S provided, between photovoltaic array P constructed by connecting at least two photovoltaic arrays PL, PR of identical characteristics in parallel and a lead L to which the electric energy of the photovoltaic array P is supplied, with a detecting circuit NC for detecting the operating point of the photovoltaic array P, characterized in that the detecting circuit MC is provided with current limiting elements DL, DR with different voltage drops in forward direction connected in series to each of the two photovoltaic arrays PL, PR and that the system calculates the power of the two photovoltaic arrays PL, PR by detecting the terminal voltages of the two photovoltaic arrays PL, PR by means of those current limiting elements DL, DR and detects the operating point of the photovoltaic array P from the difference of power (or differential current) between the two photovoltaic arrays PL, PR.

7 Claims, 9 Drawing Sheets

SOLAR ENERGY SYSTEM

BACKGROUND OF THE INVENTION

1. Field of the Invention

The present invention relates to a solar energy system designed to detect the operating point of a photovoltaic source so as to be capable of automatically tracking the maximum power point of the photovoltaic source and stably and constantly supplying the maximum power from the photovoltaic source to loads.

2. Description of the Related Art

Figure 13:
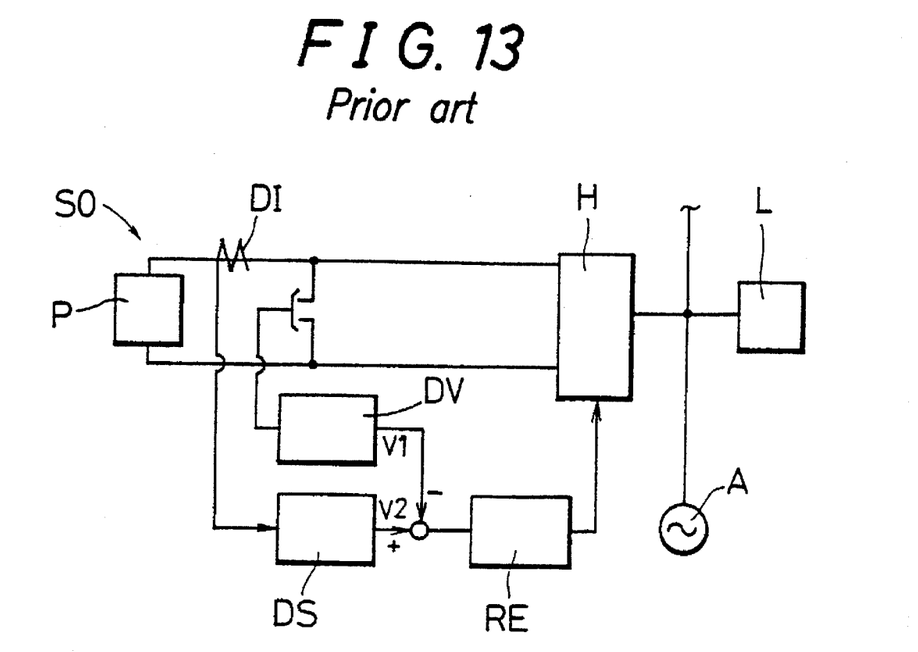
FIG. 13 is a circuit diagram showing an example of a conventional solar energy system.

Conventionally, a system as shown in FIG. 13 is proposed as a solar energy system constructed in a way to obtain the maximum power from a photovoltaic source. This solar energy system SO is constructed by connecting a photovoltaic array P to a stand-alone system load L and other utility system A, respectively, through a DC/DC converter H such as DC/AC inverter, etc. Specifically it is designed to supply the maximum power from the photovoltaic array P to the stand-alone system load L and the other utility system A by being provided with a voltage transfer DS which sets a voltage value enabling output of the maximum power by the photovoltaic array P in response to the output signal from a current sensor D1 which detects the output current of the photovoltaic array P, a voltage detector DV which detects the output voltage of the photovoltaic array P and a regulator RE which compares a voltage value V1 detected by the voltage detector DV with a set voltage value V2 of the voltage command device DS and which controls the output voltage or output current of the converter H (For example, see Japanese Unexamined Patent Publication JPA 56-91630 (1981)).

However, the output characteristics of a photovoltaic cell depend on environmental changes such as atmospheric temperature, solar irradiance, etc., dust on the light receiving face of the photovoltaic cell, yearly declination of the photovoltaic cell, etc. The conventional solar energy system SO described above, which is designed to simply preset a voltage value enabling output of the maximum output by the photovoltaic array P and to control the output of the photovoltaic array P based on this set value, incapable of accurately tracking the maximum power point in response to the fluctuations of characteristics of the photovoltaic cell due to environmental changes, etc. as well as of utilizing the photovoltaic source always at a high efficiency.

Moreover, to solve such a problem, one may propose a method which consists of measuring the temperature on the back face of the photovoltaic cell and determining the operating point of the photovoltaic cell which is variable with temperature fluctuations by referring to the characteristics data of the photovoltaic cell obtained in advance by experiments, etc. or also a method which consists of forcibly moving the operating point of the photovoltaic cell and searching for the maximum power point of the photovoltaic cell by comparing differences between the power produced before the movement and that produced after the movement. However, it is difficult to effectively operate the photovoltaic cell if its characteristics are unknown and, even when characteristics data, etc. obtained by experiments are abundantly available, it is impossible to accurately obtain the maximum power point of the photovoltaic cell in the case where the characteristics of the photovoltaic cell have changed because of yearly declination, etc. or where the characteristics have deteriorated because of dust on the light receiving face, etc.

Especially, in the method of forcibly moving the operating point of the photovoltaic cell and comparing the differences between the power produced before the movement and that produced after the movement, one cannot determine the exact cause of fluctuations in the output of an apparatus in the case where any major changes in the natural environments such as shower or movement of clouds, etc. occur at the time of movement of the operating point, even if it is possible to avoid problems of deterioration of characteristics due to yearly declination, etc. or changes of characteristics due to dust on light receiving face, etc. This makes it impossible to determine the accurate maximum power point. To solve this problem, it is necessary to build complicated logical circuits capable of performing majority logic, fuzzy logic, etc., leading to another problem of the need of not only large equipment size but also extreme complexity of the entire system.

SUMMARY OF THE INVENTION

The object of the present invention, which has been devised in view of various problems of the conventional system described above, is to provide a solar energy system of simple construction capable of utilizing the photovoltaic source always at a high efficiency without being affected by environmental changes or yearly declination of photovoltaic cell, etc.

Accordingly, the invention provides a solar energy system constructed by connecting, between a photovoltaic source and a load, detecting means for detecting the operating point of the photovoltaic source and power converting means for controlling the power to be supplied to the load based on the detection signal from the detecting means, characterized in that the detecting means connects at least two photovoltaic arrays with approximately the same voltage-current characteristics in parallel, connects current limiting elements of different voltage drops in the forward direction in series to each of the photovoltaic arrays and detects the operating point of the photovoltaic source based on the output signal from each of the current limiting elements.

The invention further provides the above energy system, characterized in that the detecting mean includes first calculating means for calculating respective power values of the two photovoltaic arrays based on the output signal from each of the two current limiting elements, provides the power converting means with the output as a detection signal based on the calculation by the first calculating means, and the power converting means controls the power in order for the respective power values of the photovoltaic arrays to be nearly equal.

The invention still further provides the above solar energy system, characterized in that the detecting means includes second calculating means for calculating the current value differential of the two photovoltaic arrays based on the output signal from each of the two current limiting elements, provides the power converting means with the output as a detection signal based on the calculation by the second calculating means, and the power converting means controls the power in order for the current value differential to be nearly equal to a predetermined value.

The invention also provides a solar energy system constructed by connecting, between a photovoltaic source and a load, detecting means for detecting the operating point of the photovoltaic source and power converting means for controlling the power to be supplied to the load based on the detection signal from the detecting means, characterized in that the detecting means connects at least two photovoltaic arrays with different open-circuit voltage in parallel, connects current limiting elements of approximately the same voltage drops in the forward direction in series to each of the photovoltaic arrays and detects the operating point of the photovoltaic source based on the output signal from each Of the current limiting elements.

The invention further provides the above solar energy system, characterized in that the detecting means includes a third calculating means either for calculating the power value differentials of the two photovoltaic arrays based on the output signal from each of the two current limiting elements or for calculating the current value differential from respective current values of the photovoltaic arrays, provides the power converting means with the output as a detection signal based on the calculation by the third calculating means, and the power converting means controls the power in order for the power value differentials of the two photovoltaic arrays to be nearly equal to a predetermined values, alternatively in order for the current value differential of the two photovoltaic arrays to be nearly equal to a predetermined values.

The invention additionally provides the above solar energy system, characterized in that the load L includes other systems of power source.

Here, part or all of the photovoltaic cells constituting the photovoltaic source may be used for the detecting circuit, or a photovoltaic cell provided separately from the photovoltaic source may be load exclusively for the detecting circuit.

According to the invention, operating points at different voltage values shifted by current limiting elements of different voltage drops in the forward direction can be detected, and by simultaneously detecting characteristics (e.g., power value, current value) of two photovoltaic arrays at this operating points, it may be considered that the operating point of the photovoltaic source agrees with the maximum power point if the power values of the two photovoltaic arrays at the maximum power point are nearly equal (or if the differences of current are nearly equal to the predetermined values).

Preferably, the power values of the two photovoltaic arrays may be calculated by the first calculating means based on the output signal from the two current limiting elements, and the power converting means may be controlled by the detection signal obtained upon comparison of the power values. Consequently, since the power to be supplied from the two photovoltaic arrays is controlled by the calculation results based on the output from the photovoltaic arrays, the respective power values of the photovoltaic arrays which are detected simultaneously turn out to be nearly equal. It can then be considered that the photovoltaic source including the two photovoltaic arrays is operating at its maximum power point.

More preferably, the second calculating means calculates the current value differential of the two photovoltaic strays based on the current values thereof which correspond to the detection signal from the two current limiting elements. The power converting means may be controlled by the detection signal obtained upon comparison between the current value differential and a predetermined value.

As a result, since the current value differential is made nearly equal to the predetermined value, it can be considered that the photovoltaic source, including the both photovoltaic arrays, is operating at its maximum power point. Also, the power converting means can be controlled based on each current value differential which is to be detected, thus allowing the simple construction of circuits.

Moreover, according to the invention, different operating points at the same voltage value by current limiting elements of almost identical voltage drops in the forward direction can be detected, and by simultaneously measuring characteristics of two photovoltaic arrays at the operating points, it may be considered that the operating point of the photovoltaic array agrees with the maximum power point if the differential power (or current) of the two photovoltaic arrays is almost equal to the predetermined value.

Preferably, the third calculating means calculates respective power values of the two photovoltaic arrays, or the current value differential thereof based on the output signal from the two current limiting elements. The power converting means may be controlled by the detection signal obtained upon comparison of the power values. Also, it may be controlled by the detection signal obtained upon comparison between the current value differential and a predetermined value. As a results since the respective power values of the two photovoltaic cells which are detected simultaneously are nearly equal, or the current values differential of the photovoltaic arrays at a simultaneous measuring point has become nearly equal to the predetermined value, it can be considered that the photovoltaic source, including the two photovoltaic arrays, is operating at its maximum power point, More preferably, the load L may include other systems of power source. Consequently, the power which is supplied from the photovoltaic source may not only be changed at the load L, but also may be supplied to other external devices connected to the other systems of power source.

As explained above, according to the invention, the solar energy system is designed to detect operating point of the photovoltaic source by utilizing current limiting elements connected in series to each of at least two photovoltaic arrays; and therefore, there will be no errors in the measurement of the power produced by the photovoltaic source for reason of fluctuations of output characteristics of the photovoltaic source due to change of solar irradiance, temperature changes, yearly declination, etc. as in the past and it has become possible to automatically track the maximum power point of photovoltaic cells constantly. Thus a photovoltaic source of high efficiency is obtained.

Moreover, according to the first solar energy system, it is possible to automatically track the maximum power point of photovoltaic cells even if the exact characteristics of the photovoltaic source are unknown. Furthermore, according to the second solar energy system, the circuit construction of the detecting circuit can be made very simple because there is no need of any multiplier, etc. which is required for the first solar energy system. Still more, the absence of multiplier enables great improvement of the response speed required for the judgment of the maximum power point. As a result, in photovoltaic cell type automobiles which are attracting much attention these days, it becomes possible to improve the driving performances of the vehicle because quick response of the maximum power point can be made in response to changes in the reception of light of the photovoltaic cell due to various environmental changes produced during the driving of the vehicle, or changes in the output characteristics of the photovoltaic cell due to cooling by wind produced during the driving of the vehicle in addition to changes of solar radiation due to atmospheric changes.

According to the invention, the power converting means is controlled by the output from two current limiting elements which are connected in series to the two photovoltaic arrays, respectively, and thus, the respective power values to be supplied from both photovoltaic arrays are made equal. This enables the solar energy system to track the maximum power point of the photovoltaic arrays which may incessantly vary, and as a result, to constantly be in operation at the maximum power point.

According to the invention, the power converting means is controlled by the output from two current limiting elements which are connected in series to the two photovoltaic arrays, respectively and thus, the current value differential of the photovoltaic arrays is made equal to a predetermined value.

This enables the solar energy system to track the maximum power point of the photovoltaic arrays which may incessantly vary, and as a result to constantly be in operation at the maximum power point.

The second calculation means does not require a circuit for multiplation unlike in the case of obtaining power values, and can be made in a very simplified circuit construction. Further, a response speed required for determining the maximum power point is improved.

As used herein, the term "photovoltaic arrays" means the term commonly referred to as "solar battery", which consists of an array of photovoltaic cells.

BRIEF DESCRIPTION OF THE DRAWINGS

Other and further objects, features, and advantages of the invention will be more explicit from the following detailed description taken with reference to the drawings wherein.

DETAILED DESCRIPTION OF PREFERRED EMBODIMENTS

Now referring to the drawings, preferred embodiments of the invention are described below.

First, an embodiment of the first solar energy system will be explained in detail.

EXAMPLE 1-1

Figure 1:
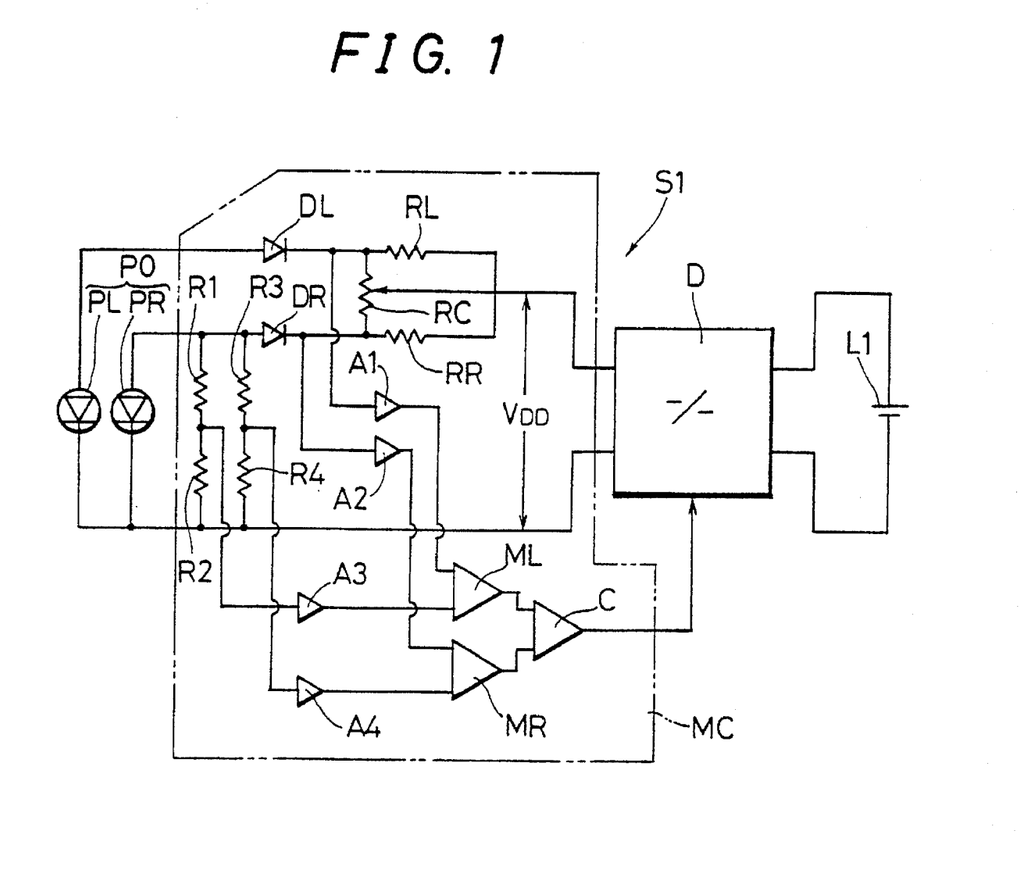
FIG. 1 is a circuit diagram showing an embodiment of a first solar energy system of the invention.

As shown in FIG. 1, a solar energy system S1 is constructed in a way to supply electric energy of the photovoltaic array P0 to the load L (storage battery) through a detecting circuit MC for detecting the operating point of a photovoltaic array P and a power converting means D (DC/DC converter). Here, the photovoltaic array P0 has a construction realized by connecting two arrays PL, PR (photovoltaic arrays consisting of a plural number of cells) of the same characteristics (voltage-current characteristics) for the sake of simplification. Moreover, the detecting circuit MC is designed to detect the currents and voltages of the respective arrays PL, PR, calculate the powers and the difference of power from those detected values, input control signals in the power converting means D based on the results of that calculation and control the input terminal voltage of the power converting means D so as to automatically track the maximum operating point of the photovoltaic array P0 at all times.

Figure 2:
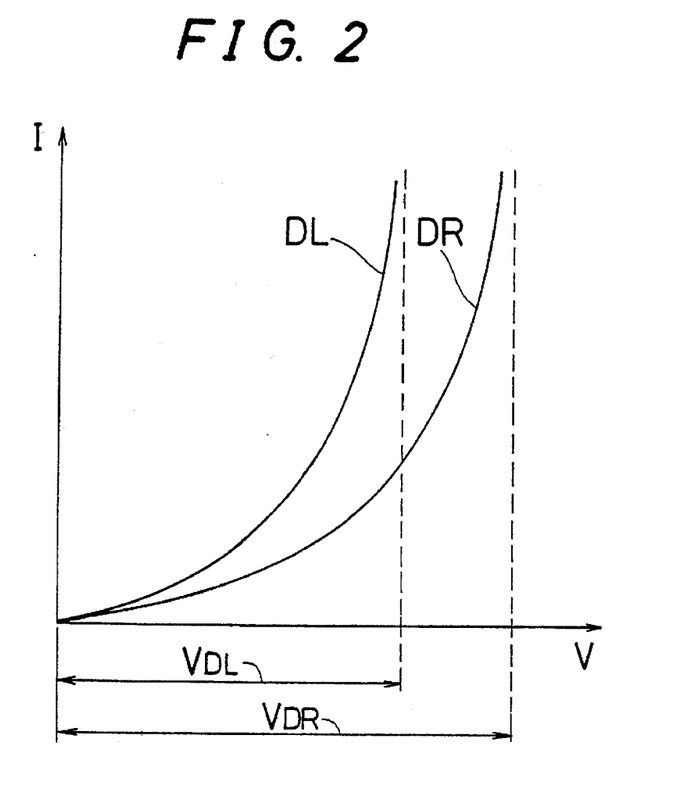
FIG. 2 is a voltage-current characteristic chart of a diode.

The output currents of the arrays PL, PR pass through the diodes DL, DR, which are current limiting elements with different characteristics, provided in the detecting circuit MC, and the joint current becomes the input current of the power converting means D. Moreover, microresistors RL, RR for detecting the current from respective arrays are connected to the respective arrays. The microresistors RL, RR are connected to each other by means of a resistor RC which balances deviations of the resistance values of the microresistors RL, RR. The current limiting elements will be all right if they have at least different voltage drape in forward direction from each other as described later. The microresistors RL, RR are those generally used as shunt resistors for detecting current and are of small values not having any influence on the current (charge current) flowing to the load L (storage battery), and a micro-voltage by a current corresponding to the amount of power generation of the respective arrays is produced at both ends of the respective arrays, The diodes DL, DR will be, for example, a Shottkey barrier diode with small voltage drops in the forward direction and an ordinary soft recovery diode. Namely, because two diodes of different characteristics give a difference of operating voltage to the two arrays PL, PR connected to those diodes, the operating voltage of the respective arrays is not affected by the current value which is variable depending on the amount of power generation and the respective arrays operate by producing a differential voltage about equal to that determined by the characteristics of those diodes. The voltage-current characteristics of those diodes are as shown in FIG. 2, and the amount of voltage drops in forward direction of the respective diodes is not influenced by the current value flowing through the diodes and is saturated when it exceeds a certain value. Namely, the amount of voltage drop in forward direction of the diode DL is given as VDL and that of the diode DR as VDR.

Amplifiers A1, A2 connected to each of the diodes DL, DR are intended to detect the current flowing through the respective arrays PL, PR. The current flowing away PL and detected by amplifier A1 is referred to as "current IPL". The current flowing array PR and detected by amplifier A2 is referred to as "current IPR". The circuit which consists of an amplifier A3, a resistor R1, a resistor R2 and the circuit which consists of an amplifier A4, a resistor R3, a resistor R4 are for detecting the operating voltage of the arrays PL, PR respectively. Moreover, multipliers ML, MR, which are intended to determine the amount of power generation (hereinafter referred to "electric energy") of the arrays PL, PR respectively, calculate the electric energy by performing multiplication of the current value by the voltage value obtained for each array. Furthermore, it is possible to compare the amounts of power generation of the respective arrays calculated by the multipliers ML, MR by means of a comparator C and increase or decrease the input terminal voltage of the power converting means D with the output signal transmitted from this comparator C to the power converting means D. Here, the power converting means D performs feedback control to adjust the input voltage to the command value.

Next, explanation will be given on the control of the input voltage of the power converting means D.

Because the input voltage of the power converting means D is VDD as shown in FIG. 1, the operating voltages of the respective arrays are voltages higher than this VDD by an amount equal to the amount of drop of voltage in forward direction of the respective diodes (VDL for diode DL and VDR for diode DR). Namely, an operating voltage VPL of the array PL becomes as VPL=VDD+VDL and an operating voltage VPR of the array PR becomes as VPR=VDD+VDR. At that time, a difference is produced, though slight, in the amount of power generation between the respective arrays, because diodes of different voltage drops in forward direction are used.

Since the amount of voltage drop in forward direction produced here is about determined by the kind of the current limiting elements, the amount of power generation changes under the influence of the amount of solar radiation or temperature, etc., thus indicating a fixed value of voltage drop even with great fluctuations of the current flowing through the current limiting elements. And that produces a difference between the arrays in the amount of power generation corresponding to the difference in the amount of voltage drop in forward direction of those current limiting elements, though it is only a slight difference.

Figure 3:
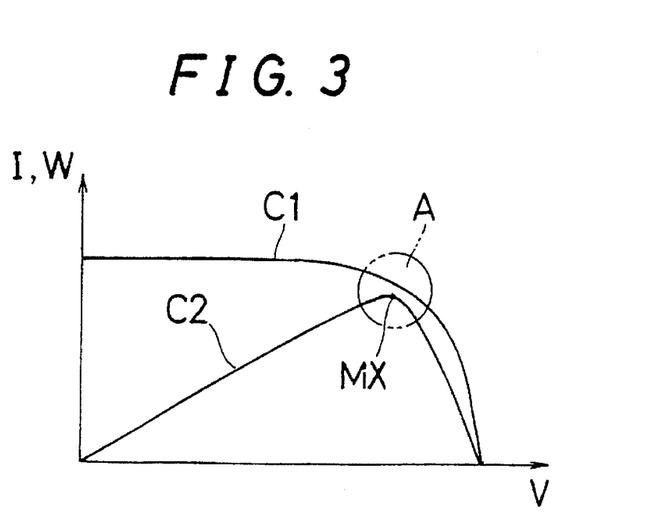
FIG. 3 is a voltage-current output characteristic chart of a photovoltaic cell.
Figure 4:
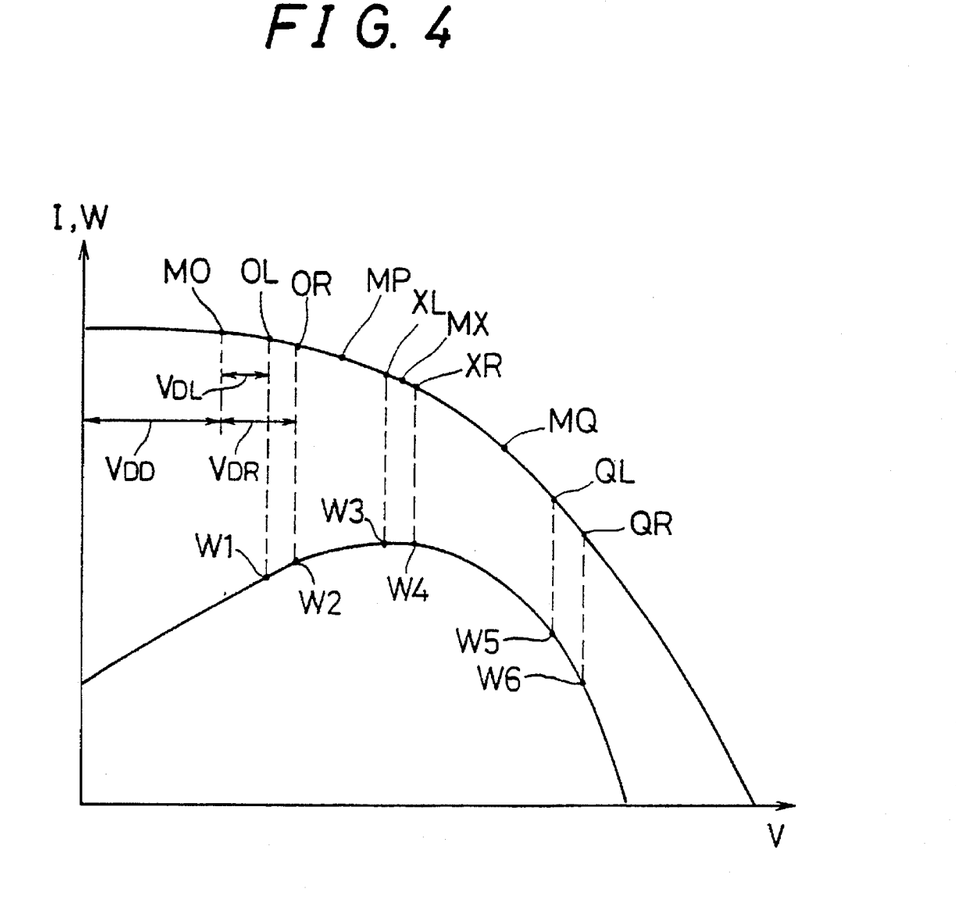
FIG. 4 is an enlarged view of FIG. 3A.

The amounts of electric energy WPL, WPR of the arrays PL, PR are WPL=VPL×IPL, WPR=VPR×IPR respectively and those amounts greatly vary depending on the operating voltage even under the condition of one same amount of solar irradiance. Namely, as shown in FIG. 3 and FIG. 4, the voltage (V)-current (I) characteristics of a photovoltaic array change as the curve C1 while the voltage (V)-power (W) characteristics change as the curve C2 generally. In this way, the maximum power point of a photovoltaic array is found at one point only (point MX) and the output suddenly drops when it deviates from this operating point. In this embodiment, those characteristics agree with each other because the characteristics of the arrays PL, PR are identical.

By thus utilizing such characteristics of the photovoltaic cell, the detecting circuit MC is designed to be capable of the maximum power point tracking of the photovoltaic cell so as to take out the maximum power at all times. The operating voltage of the photovoltaic array P0 can be moved to any desired point on the curve C1 by changing the command value of the input voltage of the power converting means D. Moreover, as mentioned earlier, a slight difference is produced in the operating voltage of the photovoltaic cell because of the shifting due to adoption of diodes of different characteristics in the present invention, The state with such difference exits in 2 arrays simultaneously because (the photovoltaic array P) is divided into two arrays of same characteristics. Therefore, it is possible to measure the amount of electric energy of the respective arrays at about the same hours and easily judge whether the maximum operating point of the respective arrays is higher or lower compared with the current operating point from the difference in amount of electric energy of the respective arrays.

Supposing that (the photovoltaic array P0) is now operating at point MO which is lower than the maximum power point MX, the input voltage of the power converting means D is VDD and it is operating at point MO. The operating voltage of the respective arrays is point OL which is higher than VDD by VDL with the array PL and point OR which is higher than VDD by VDR with the array PR. By comparing the amounts of power generation at those 2 points, we can see that the array PR which is operating at point OR closer to the maximum power point MX is producing a larger amount of power. On the other hand, we can see that, in the case where the power converting means D is operating at point MQ which is higher than the maximum power point ME, the array PL, which is operating at point QL closer to the maximum power point MX, is producing a larger amount of power than the array PR operating at point QR. The photovoltaic array P0 works with an almost maximum output in the case where the power converting means D is operating at point MP when the maximum power point MX is located between point XL at which array PL is operating and point XR at which array PR is operating.

Namely, if we put the amounts of power produced at arrays PL, PR when the operating point of the power converting means D is at point MO as W1, W2, the amounts of power produced at arrays PL, PR when the operating point is at point MP as W3, W4 and the amounts of power produced at arrays PL, PR when the operating point is at point MQ as W5, W6, we can see that we obtain the relation of the amounts of W1<W2<W3, W3=W4, W4>W5>W6. In this way, it becomes clear that, when there is no difference in the amount of electric energy between the two arrays, the arrays PL, PR i.e. the photovoltaic array P with relatively identical cell characteristics is operating at the maximum power point.

By thus providing an operating point of a slightly different voltage shifted by means of diodes DL, DR with different characteristics in the neighborhood of the maximum power point of the photovoltaic cell and by simultaneously measuring the amount of power generation of the photovoltaic cell at this operating point, it becomes possible to easily detect whether the operating point is higher or lower than the maximum power point. And it becomes possible to always track the maximum power point of the photovoltaic array P, which is constantly changing depending on the state of solar radiation and the state of temperature, by providing (the power generation system) with a mechanism for controlling the operating point of the power converting means D to the right (direction of higher voltage) at point MO and to the left (direction of lower voltage) at point MQ.

EXAMPLE 1-2

Figure 5:
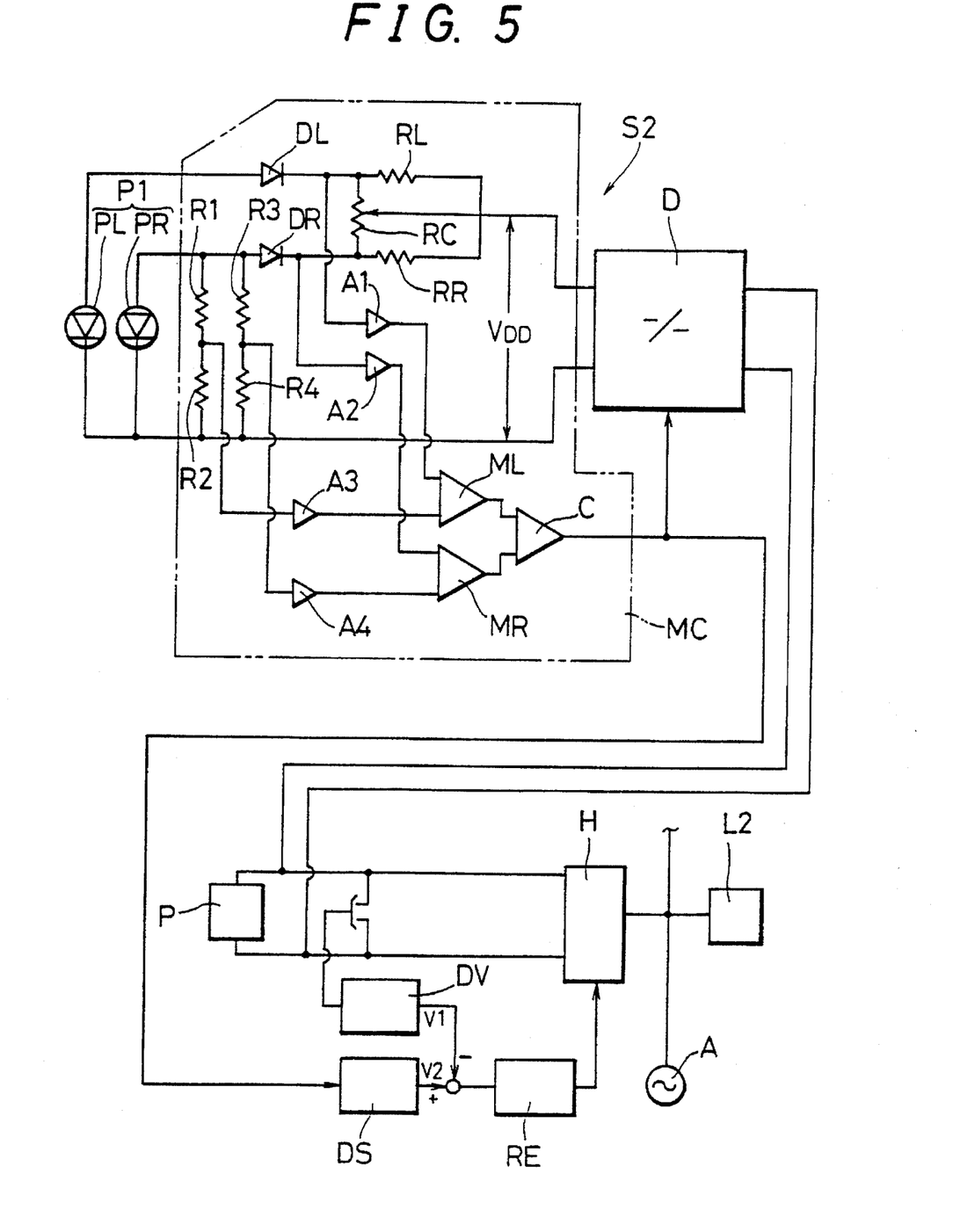
FIG. 5 is a circuit diagram showing other embodiment of the first solar energy system of the invention.

Although, in the previous embodiment, the photovoltaic array constituting the photovoltaic source which supplies power to the load and the photovoltaic array used for the detecting circuit which detects the maximum power point were the same photovoltaic array, one may also construct a photovoltaic generation system S2 having a special photovoltaic array P1 for the detecting circuit MC provided separately from the photovoltaic array P, by connecting to each other a conventional photovoltaic generation system (in FIG. 13) constituted in a way to supply power from the photovoltaic array P to the load L2 and the power source A for other lines and a detecting circuit MC for tracking the maximum power point of the photovoltaic array P1 constructed in the same way as in embodiment 1-1, as shown in FIG. 5.

By inputting into the voltage command device DS, the signal from the comparator C constituting the detecting circuit MC instead of the signal from the current sensor DI provide in a solar energy system in the prior art one may convert the signal from the comparator C to the signal for increasing or decreasing the set voltage V2 outputted from voltage command device DS. The voltage value detected by the voltage detector DV is voltage V1, and on the basis of a comparison between the set voltage V2 and the voltage V1, a regular is controlled. One may also the solar energy system S2 construct system in a way to input the output of the voltage converting means D in parallel with the photovoltaic array P, so as to supply power to both the power source A for other lines and the load L2.

According to this embodiment, the detecting circuit MC which automatically tracks the maximum power point can be realized as a circuit highly fit for general use not affected by the scale of power generation of the photovoltaic array P. Moreover, the power converting means H can have a very simple construction because there is no need of furnishing the power converting means H with a function of tracking the maximum power point.

EXAMPLE 1-3

Figure 6:
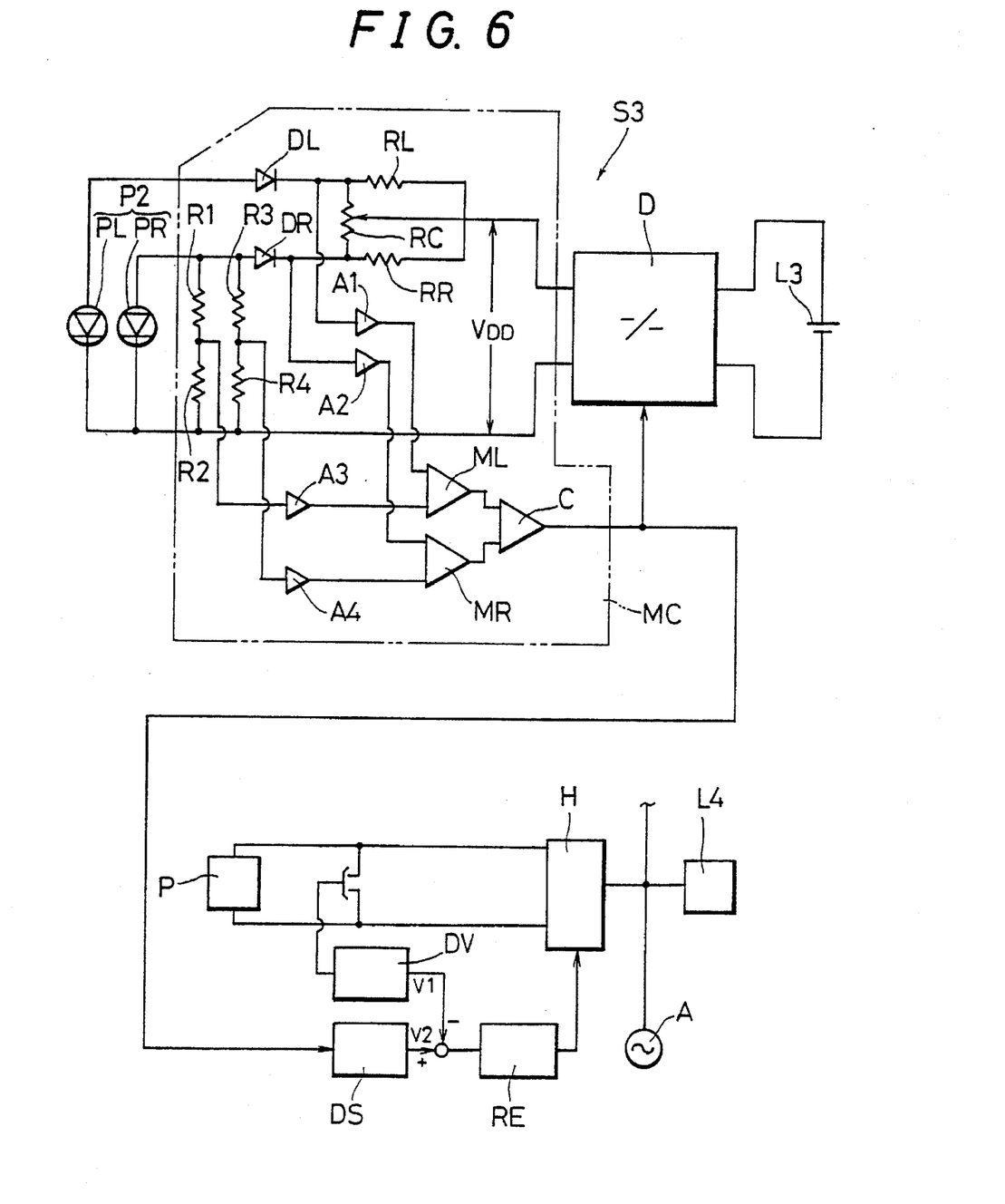
FIG. 6 is a circuit diagram showing other embodiment of the first solar energy system of the invention.

Moreover, as shown in FIG. 6, one may also construct a photovoltaic generation system S3 having a special photovoltaic array P2 for the detecting circuit MC provided separately from the photovoltaic array P and supplying the output from this photovoltaic array P2 to load L3 provided separately from the load L, by connecting (as previously indicated in Example 1-2) to each other a conventional photovoltaic generation system SO (as shown in FIG. 13 constituted in a way to supply power from the photovoltaic array P to the load L and the power source A for other lines and a detecting circuit MC for tracking the maximum power point of the photovoltaic array P2 constructed in the same way as in Example 1-1.

According to this embodiment, it becomes possible to supply power to a wide variety of loads and improve the performances of tracking the maximum power point of the photovoltaic cell because the operation of the detecting circuit MC stabilizes as the load L2 is electrically connected to this detecting circuit MC.

EXAMPLE 1-4

Moreover, in embodiment 1-1, one may have mutually different open-circuit voltage values for the arrays connected in parallel and connect diodes of the same characteristics (ordinary diodes of the same voltage drop in forward direction) to the respective arrays in series, so as to detect the maximum operating point by calculating the difference in power between the arrays.

Figure 7:
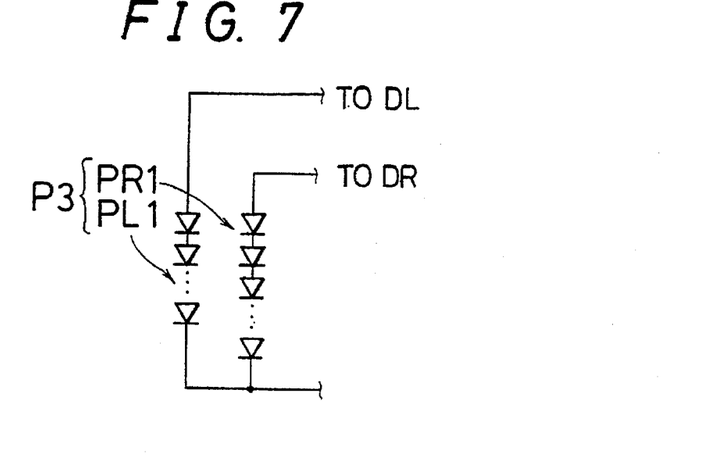
FIG. 7 is a partially omitted circuit diagram showing the state of serial connection of arrays in other embodiment of the first solar energy system of the invention.

Namely, one may also constitute the photovoltaic array P3 with the arrays PL, PR with different numbers in series (different open-circuit voltage values for the arrays PL, PR, i.e. open-circuit voltage of PR>open-circuit voltage of PR) as shown in FIG. 7. In the later stage of the multipliers ML, MR which calculates, in place of the comparator C, the difference of power between the arrays, connect a subtractor MD for calculating the difference of power between the arrays PL1. PR1 indicated in FIG. 8 and compare the results of this subtractor MD with the set value (difference between point WL which is the maximum power point of the array PL and point WR which is the maximum power point of the array PR, $\Delta$W) set in advance by a variable power source VR, so as to detect the case of the smallest possible difference from $\Delta$W indicated in FIG. 9 as the maximum power point of the photovoltaic array P. The line VM of the voltage value at the maximum power point in the V-W curve drawn by combining the respective arrays does not necessarily agree with WR or WL.

Figure 8:
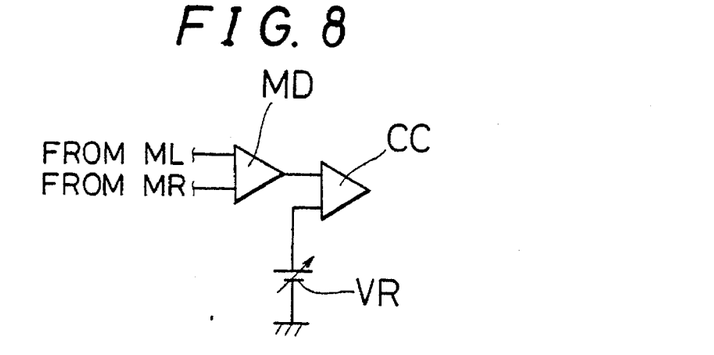
FIG. 8 is a partially omitted circuit diagram showing other embodiment of the detecting circuit in the first solar energy system of the present invention.
Figure 9:
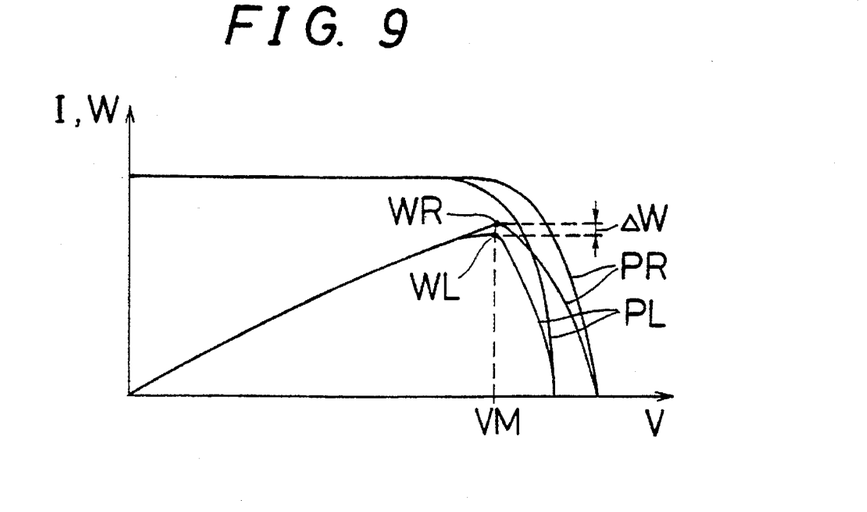
FIG. 9 is a voltage-current output characteristic chart of a photovoltaic cell.

According to this embodiment, it is easy to select the diodes to be connected in series to the respective arrays because you can use any diodes if only they have the same voltage drops in forward direction with each other, and it becomes possible to improve the detecting accuracy of the detecting circuit MC because the characteristics (degree of voltage drop) of the diodes can be adjusted as required to the magnitude of voltage of the array (number of photovoltaic cells in series). The embodiment can also be applied to embodiments 1-2, 1-3 as a matter of course.

Figure 10:
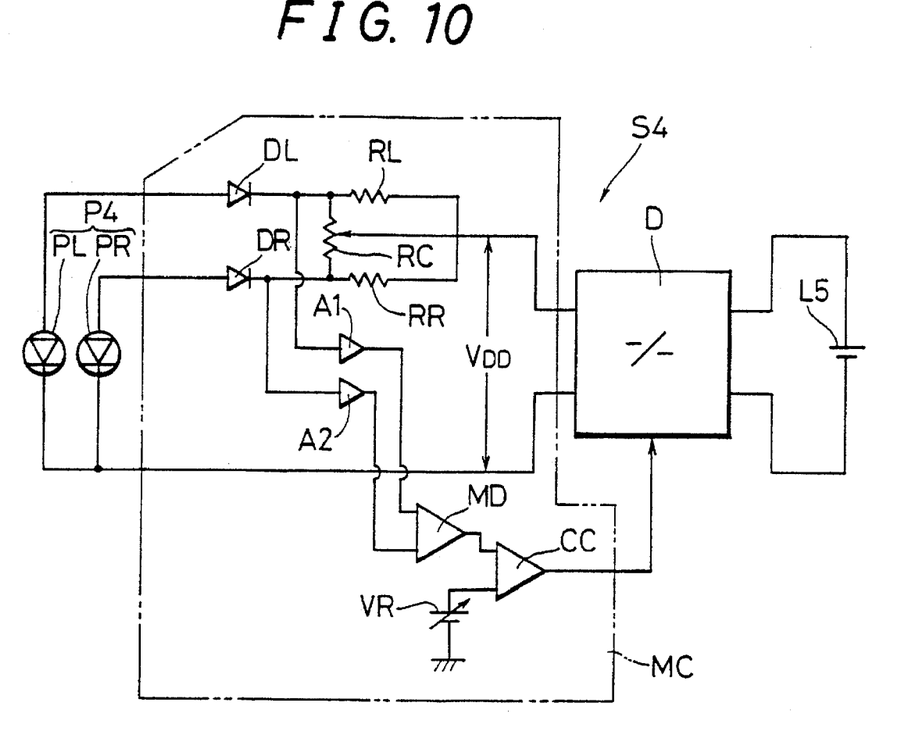
FIG. 10 is a circuit diagram showing an embodiment of a second solar energy system of the invention.

Next, we will explain in detail embodiments of the second solar energy system. photovoltaic array P4 to the load L (storage battery, for example) through the detecting circuit MC for detecting the operating point of the photovoltaic array P4 and the power converting means D (DC/DC converter, for example), in the same way as in embodiment 1-1. Here, the photovoltaic array P4 has a construction realized by connecting two arrays PL, PR (photovoltaic arrays consisting of a plural number cells) of the same characteristics (voltage-current characteristics) for the sake of simplification.

Moreover, the detecting circuit MC is designed to detect the current of the respective arrays PL, calculate the difference of current from those detected values, compare this difference of current with the current value set in advance, input control signals in the power converting means D based on the results of that calculation and control the input terminal voltage of the power converting means D so as to automatically track the maximum operating point of the photovoltaic array P at all times.

Next, explanation will be given on the circuit construction of the detecting circuit MC.

In the same way as in embodiment 1-1, the output currents of the arrays PL, PR pass through the diodes DL, DR, which are current limiting elements with different characteristics, provided in the detecting circuit MC, and the synthesized current becomes the input current of the power converting means D. Moreover, microresistors RL, RR for detecting the current flowing through the respective arrays are inserted in the circuit of the respective arrays, and the microresistors RL, RR are connected to each other by means of a resistor RC. Explanation of the voltage-current characteristics of those diodes DL, DR will be omitted because it is the same as that in Example 1-1.

Moreover, in the same way as in Example 1-1, the amplifiers A1, A2 connected to each of the diodes DL, DR are intended to detect the current flowing through the respective arrays PL, PR. The subtractor MD connected to those amplifiers A1, A2 are intended to calculate the difference of current value obtained for each array. The signal from the subtractor MD is input in the comparator CC and compared with the value set by the variable power source VR. The signal from the comparator CC increases and decreases the input terminal voltage of the power converting means D. Explanation of the power converting means D will be omitted because it is the same as that in Example 1-1.

Next, explanation will be given on the control of the input voltage of the power converting means D.

In the same way as in embodiment 1-1, the operating voltage VPL of the array PL becomes as VPL=VDD+VDL and the operating voltage VPR of the diode PR becomes as VPR=VDD−VDR. At that time, a difference is produced though slight, in the amount of current between the respective arrays because diodes of different voltage drops in forward direction are used and a difference of current, though slight, corresponding to the difference in voltage drop in forward direction of those current limiting elements is produced between the arrays.

Figure 11:
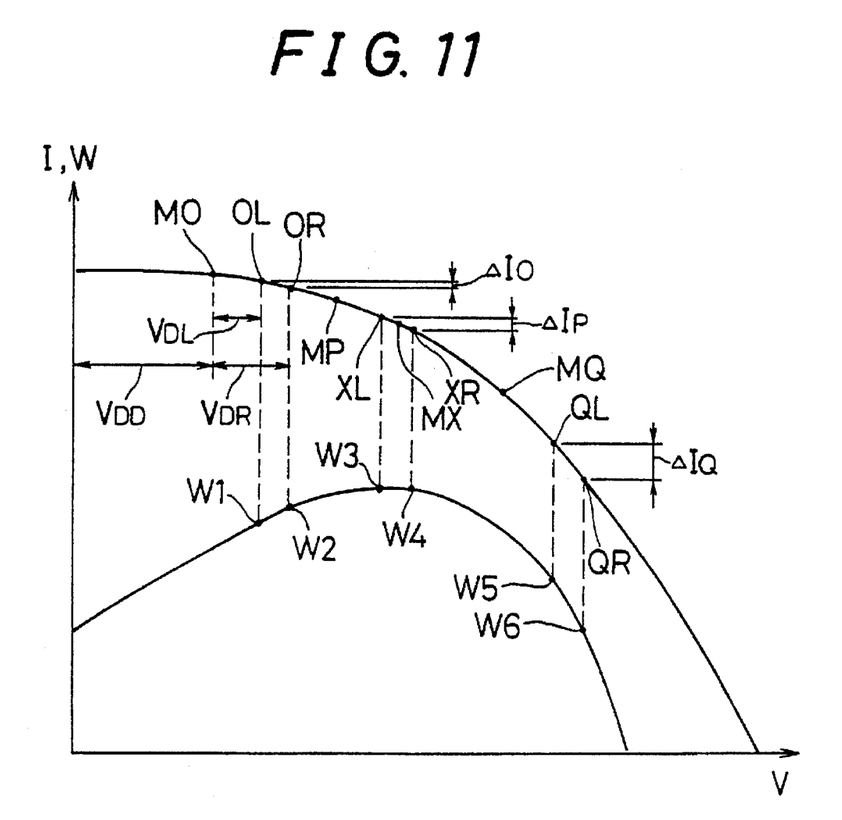
FIG. 11 is a voltage-current output characteristic chart of a photovoltaic cell.
Figure 12:
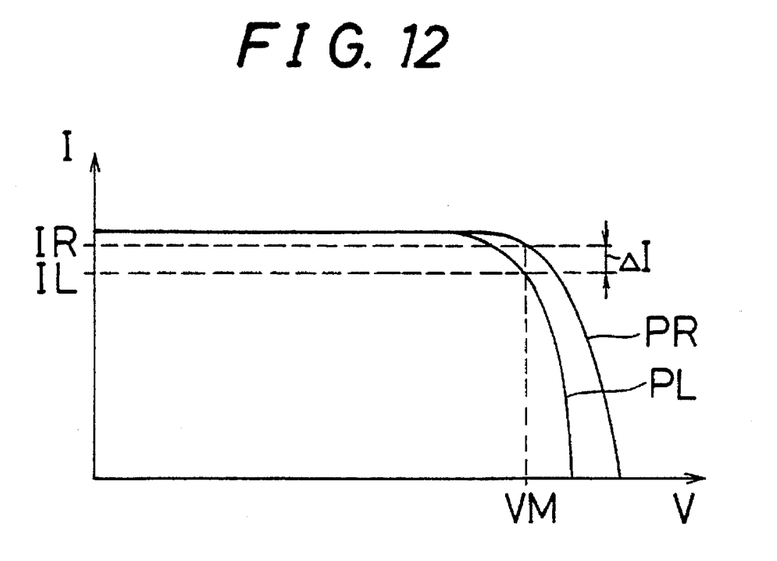
FIG. 12 is a voltage-current output characteristic chart of a photovoltaic cell.

As shown in FIG. 11, supposing that (the photovoltaic array P) is now operating at point MO which is lower than the maximum power point MX, the input voltage of the power converting means D is VDD and it is operating at point MO. The operating voltage of the respective arrays is point OL which is higher than VDD by VDL with the array PL and point OR which is higher than VDD by VDR with the array PR. A differential current ΔIO between those 2 points is small but gradually increases to ΔIP, ΔIQ in order as the operating point moves to point MP and point MQ. For that reason, by determining in advance a differential current ΔI for the case of operating point MP of the power converting means D when the maximum power point MX is found between point XL and point XR, it can be judged that the arrays PL, PR i.e. the photovoltaic array P with the relatively same cell characteristics is operating at the maximum power point when there is hardly any differential current with regard to this set raise.

According to this second solar energy system, the circuit construction of the detecting circuit MC can be made very simple because there is no need for the multipliers ML, MR required for the first solar energy system. Moreover, the absence of multiplier enables sharp improvement of the response speed required for the judgement of the maximum power point. As a result, it becomes possible, particularly in photovoltaic type automobiles which are attracting much attention these days, to improve the driving performances of the vehicle because quick response of the maximum power point can be made in response to changes in the reception of light of the photovoltaic cell due to various environmental changes produced during the driving of the vehicle or changes in the output characteristics of the photovoltaic cell due to cooling by wind produced with the driving of the vehicle, in addition to changes of solar irradiance due to atmospheric changes.

EXAMPLE 2-2

Moreover, in embodiment 2-1, you may have mutually different open-circuit voltage values for the arrays connected in parallel and connect diodes of the same characteristics (soft recovery diodes of the same voltage drop in forward direction) to the respective arrays in series, so as to detect the maximum operating point by calculating the difference in power between the arrays. Namely, you can obtain the same effects as embodiment 2-1 by constituting the arrays PL, PR with different numbers in series (different open-circuit voltage values for the arrays PL, PR, i.e. open-circuit voltage of PR>open-circuit voltage of PR) as shown in FIG. 7 and controlling in such a way that the differential current (IR-IL) produced between the arrays may be constant (differential current ?I at the voltage value VM indicating the maximum power point). Also in this embodiment, you can obtain the same effects as

EXAMPLE 1-4

In the above embodiments, explanation was given on examples using diodes as current limiting elements but they are not limited to diodes and you may also use other materials such as various kinds of resistor, etc. Moreover, in the same way as the first solar energy system, one can construct the system in a way to supply power to known loads such as power source for other lines, etc. also in the second solar energy system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A solar energy system, comprising:

a photovoltaic array comprising at least a first photovoltaic array element and a second photovoltaic array element, the first and second photovoltaic array elements being connected in parallel and having substantially identical voltage-current characteristics, detecting means for detecting the operating point of the photovoltaic array and a load, and power converting means connected to the detecting means for controlling the power to be supplied to the load based on a detection signal from the detecting means, the detecting means comprising:

at least a first current limiting element connected in series with the first photovoltaic array element and a second current limiting element connected in series with the second photovoltaic array element, the first current limiting element having a first voltage drop in the forward direction, the second current limiting element having a second voltage drop in the forward direction, the first and second voltage drops being unequal, wherein the detecting means detects the operating point of the photovoltaic array in response to an output signal from the first current limiting element and an output signal from the second current limiting element.

2. The system of claim 1, wherein the detecting means comprises:

calculation means for calculating respective power values for each of the first and second photovoltaic array elements based on output signals from each of the first and second current limiting elements, whereby the power converting means is provided with the output as a detection signal based on the calculation by the calculation means and the power converting means controls the power so that the respective power values for each of the first and second photovoltaic array elements are substantially equal.

3. The system of claim 1, wherein the detecting means comprises:

calculation means for calculating a current value differential between the first and second photovoltaic array elements based on the output signals from each of the first and second current limiting elements, whereby the power converting means is provided with the output as a detection signal based on the calculation by the calculation means and the power converting means controls the power so that the current value differential is substantially equal to a predetermined value.

4. The system of claim 1, wherein the load comprises other systems of power source.

5. A solar energy system, comprising:

a photovoltaic array comprising at least a first photovoltaic array element and a second photovoltaic array element, the first and second photovoltaic array elements being connected in parallel and having unequal open-circuit voltages, detecting means, located between the photovoltaic array and a load, for detecting the operating point of the photovoltaic array, and power converting means, connected to the detecting means, for controlling the power to be supplied to the load based on a detection signal from the detecting means, the detecting means comprising:

at least a first current limiting element connected in series with the first photovoltaic array element and a second current limiting element connected in series with the second photovoltaic array element, the first current limiting element having a first voltage drop in the forward direction, the second current limiting element having a second voltage drop in the forward direction, the first and second voltage drops being substantially equal, wherein the detecting means detects the operating point of the photovoltaic array in response to an output signal from the first current limiting element and an output signal from the second current limiting element.

6. The system of claim 5, wherein the detecting mean comprises:

calculation means for calculating at least one of a power value differential between the first and second photovoltaic array elements based on output signals from each of the first and second current limiting elements and a current value differential between the first and second photovoltaic array elements, whereby the power converting means is provided with the output as a detection signal based on the calculation by the calculation means and the power converting means controls the power so that at least one of the power value differential and the current value differential is substantially equal to a predetermined value.

7. The system of claim 5, wherein the load comprises other systems of power source.

* * * * *